May 11, 1937. D. F. LINSLEY 2,079,654
FLUID PRESSURE OPERATED GEAR SHIFTING DEVICE
Filed March 25, 1935
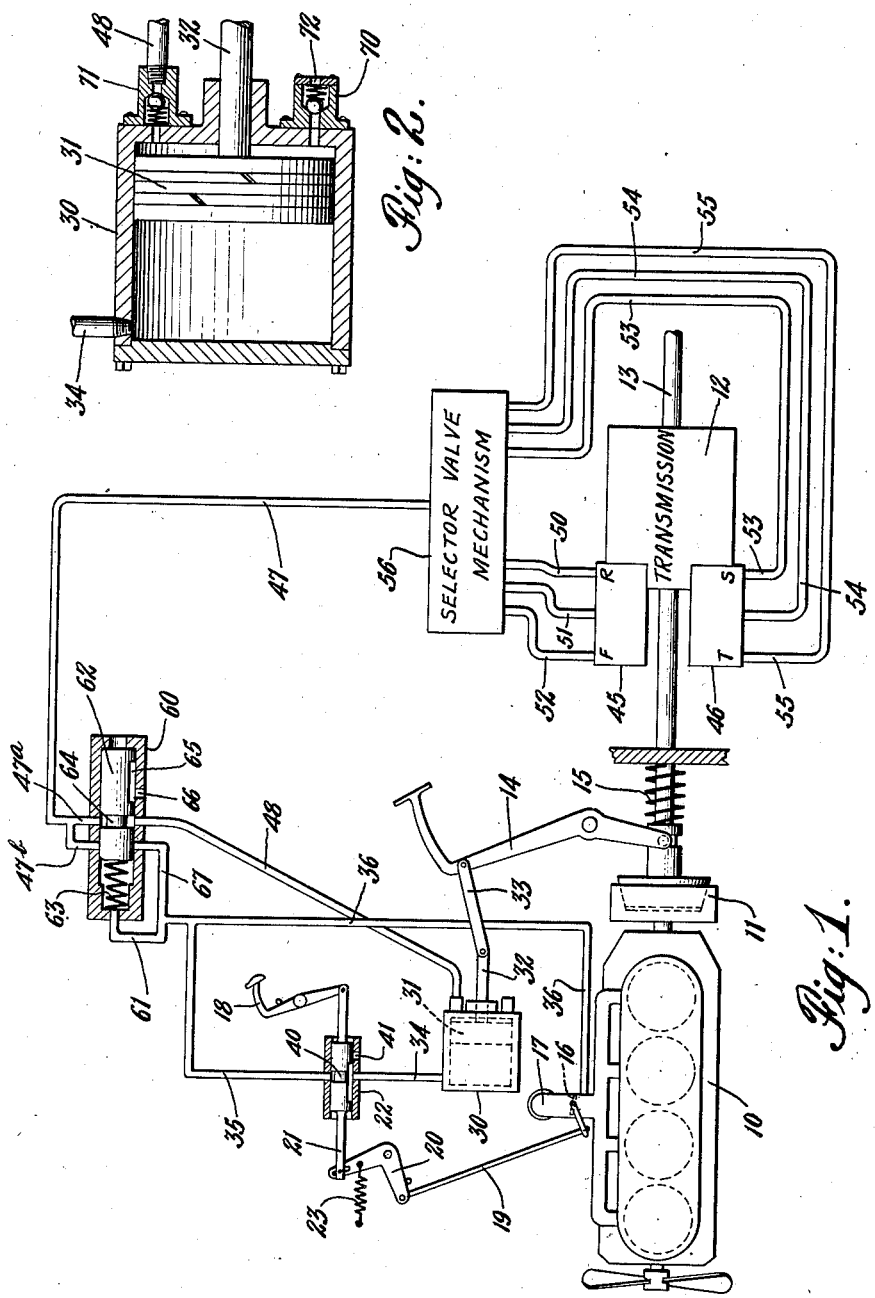
INVENTOR.
Douglas F. Linsley
BY
Morgan, Finnegan and Durham
ATTORNEYS.

Patented May 11, 1937

2,079,654

UNITED STATES PATENT OFFICE 2,079,654

FLUID PRESSURE OPERATED GEAR SHIFTING DEVICE

Douglas F. Linsley, Old Greenwich, Conn., assignor to Vaco Products, Inc., a corporation of Delaware Application March 25, 1935, Serial No. 12,961

8 Claims. (Cl. 192—.01)

The present invention relates to automotive vehicles and more particularly to a novel and improved fluid pressure operated gear shifter capable of being operated under abnormal conditions.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serve to explain the principles of the invention.

Of the drawing:

Figure 1 is a diagrammatic plan view showing an illustrative embodiment of the present invention and the interconnection of its various parts; and Figure 2 is a cross section of the clutch-operating cylinder shown in Figure 1.

The present invention has for its object the provision of a novel and improved fluid pressure operated gear shifting mechanism for use in connection with the transmission in an automotive vehicle. A further object of the invention is the provision of a vacuum-operated gear shifter and automatic clutch with which the gears can be shifted by actuation of the clutch mechanism upon failure of the vacuum-producing means. Still another object of the invention is the provision of a clutch-operating vacuum cylinder which may also serve as a vacuum pump.

Referring now in detail to the illustrative embodiment of the invention as shown in the accompanying drawing, the automotive vehicle is provided with an internal combustion engine 10 connected through clutch 11 to a conventional selective gear transmission 12 which serves to drive a propeller shaft 13 at different speeds relative to engine speed. A pedal 14 is provided for disengaging the clutch 11 which is normally held in engaged position by spring 15. The speed of the engine is controlled by means of a throttle valve 16 in the intake 17, and throttle valve 16 is moved by means of accelerator pedal 18 or other suitable control means. Accelerator 18 is pivotally mounted and connected to the throttle valve 16 by means of link 19, pivoted bell crank 20 and valve slide 21 of the clutch control valve 22, and is normally held in closed throttle or idling position by means of spring 23.

Vacuum-operated power means are provided for disengaging the clutch 11 when the throttle is in closed or idling position, and a vacuum cylinder 30 is provided with a piston 31 connected to the clutch pedal 14, or other clutch-operating means, by means of piston rod 32 and link 33. At one end, cylinder 30 is connected with the intake manifold 17 at a point between the throttle valve 16 and the engine cylinders by means of vacuum lines 34, 35 and 36. The clutch-controlling valve 22 comprises a slide 21 having a single valve opening 40 therethrough which serves to connect vacuum line 34 alternatively with vacuum line 35 or bleeder port 41, depending upon the position of the accelerator pedal 18 and throttle valve 16.

With the throttle in idling position, the slide 21 is positioned as shown in Figure 1, so that vacuum is applied to the end of cylinder 30 to disengage the clutch and hold it in disengaged relation until the accelerator pedal 18 is depressed. Depression of the pedal 18 causes the throttle 16 to be opened, accelerating the engine 10, and connecting vacuum line 34 with bleeder port 41, instead of vacuum line 35, thereby admitting atmospheric air to the cylinder 30 and allowing spring 15 to engage the clutch 11.

The vacuum-operated gear shifting means may be of any desired construction and, as shown in Figure 1, comprises a pair of double-ended cylinders 45 and 46 for selectively shifting the gears of the selective, sliding gear transmission 12 into the desired meshing relation to produce the desired driving ratio between the engine 10 and the propeller shaft 13.

Shifting cylinder 45 serves to shift the transmission into first or reverse speed, while cylinder 46 serves to shift the transmission into second or third speed, and each of the cylinders 45 and 46 is provided with a vacuum line for returning its piston to neutral position. Cylinders 45 and 46 are connected with vacuum line 36 by means of the reverse vacuum line 50, neutral line 51, first speed line 52, second speed line 53, neutral line 54 and third speed line 55.

The selection and bleeding of these several lines, as is required for the selective shifting of the gears to different speeds, is controlled by means of a selector valve 55, which in the illustrative embodiment is manually controlled.

Selector valve mechanism 55 is connected with the main vacuum line 36 by means of vacuum line 47 and through valve 60. Valve 60 comprises a small, narrow, cylinder connected at one end to vacuum line 36 by means of line 61, and slidably mounted within the cylinder is a piston valve slide 62 urged in one direction by a light compression spring 63, and moved against the compression of this spring by means of the vacuum applied to line 61. Valve slide 62 is provided with a relatively deep groove 64 intermediate its ends and is also formed with an axial groove 65 extending for a considerable distance along its length to connect line 48 with port 66 when the engine is operating. When no vacuum is applied to the end of slide 62 through line 61, the slide 62 is in the position shown in Figure 1. In that position, valve 60 connects line 47a with vacuum line 48, while application of vacuum to the end of slide valve 62 through line 61 causes the slide to move against the compression of spring 63 to connect line 47b with vacuum line 67 which is a branch of the main vacuum line 36.

Under normal conditions and with the engine running, vacuum is available for the cylinders 45 and 46 through line 36, line 67, groove 64, lines 47 and 47b and the selector valve mechanism 55, but with the engine stopped, or in case a break occurs in the main vacuum line 36, the passageway between lines 47b and 67 is closed by the end of the slide 62.

Means are provided for creating a vacuum independently of the operation of the engine 10 and these means are automatically connected with the selector valve 55 and cylinders 45 and 46 whenever the engine-produced vacuum is not available. As embodied, clutch-operating cylinder 30 is closed at both ends, and as previously described, the forward portion of this cylinder is adapted to be exhausted through vacuum line 34. At its other end, the cylinder is provided with opposed check valves 70 and 71, valve 70 permitting the air on the rear side of piston 31 to escape to atmosphere through vent 72 while valve 71 permits admission of air to the rear side of the piston 31 from line 48 as the piston is reciprocated. By opening the throttle 16 slightly, the forward side of piston 31 is in free communication with atmosphere through line 34 and port 41.

Thus, when it is necessary to crank the car by hand, the throttle 16 is opened slightly, the selector valve is set for neutral position and the clutch pedal is actuated several times, returning the pistons in cylinders 45 and 46 and their associated gears to neutral. The car may then be cranked as the gears are in neutral and when the engine starts, the vacuum sucks piston valve slide 62 to the left, connecting line 48 to atmosphere through bleeder port 66.

In case there is a leakage of air into the main line 36, the operation is the same except that the operator may shift to any desired gear speed by the proper setting of the selector valve 55, and similarly the gears may be shifted whenever desired without starting the engine.

The invention in its broader aspects is not limited to the specific mechanisms shown and described but departures may be made therefrom within the scope of the accompanying claims without departing from the principles of the invention and without sacrificing its chief advantages.

What I claim is:—

1. In a vacuum operated gear shifter system, the combination of an internal combustion engine, a vacuum operated clutch operated by said engine, a shiftable gear transmission, a vacuum operated gear shifter therefor, auxiliary means for operating said clutch and means for creating vacuum by operation of said auxiliary means and for applying the vacuum to the vacuum operated gear shifter.

2. In a vacuum operated gear shifting system the combination of an internal combustion engine, a vacuum operated clutch, a shiftable gear transmission, vacuum operated gear shifting means therefor normally operated by the running engine, an auxiliary source of vacuum and means for automatically connecting said gear shifter with said auxiliary source when the engine vacuum is not available to the gear shifter, said auxiliary source of vacuum being actuated by operation of the clutch pedal.

3. In a vacuum operated gear shifter system the combination of an internal combustion engine, a shiftable gear transmission, vacuum operated gear shifting means operated by the intake manifold suction of the engine, an auxiliary source of vacuum, means for alternatively connecting the gear shifting means with the engine or auxiliary source of vacuum, and means for controlling the connecting means by the running of the engine.

4. In a vacuum operated gear shifter system the combination of an internal combustion engine, a shiftable gear transmission, vacuum operated gear shifting means operated by the intake manifold suction of the engine, an auxiliary source of vacuum and means for alternatively connecting the gear shifting means with the engine or auxiliary source of vacuum.

5. In a vacuum operated gear shifter system the combination of an internal combustion engine, a shiftable gear transmission, vacuum operated gear shifting means operated by the intake manifold suction of the engine, an auxiliary source of vacuum, means for alternatively connecting the gear shifting means with the engine or auxiliary source of vacuum and means for controlling the connecting means by the availability of the vacuum to the gear shifter.

6. In a vacuum operated gear shifter system the combination of an internal combustion engine, a shiftable gear transmission, vacuum operated gear shifting means operated by the intake manifold suction of the engine, an auxiliary source of vacuum and means for alternatively connecting the gear shifting means with the engine or auxiliary source of vacuum, said connecting means including a valve operated by vacuum from the engine.

7. In an automotive vehicle, the combination of an internal combustion engine, a vacuum operated clutch capable of pedal operation, a fuel control element controlling the normal operation of the clutch, means independent of the engine for creating vacuum by pedal operation of the clutch, a vacuum line connected with the running engine and alternatively automatically connected with the independent vacuum means when the engine is stopped.

8. In an automotive vehicle, the combination of a vacuum operated motor comprising a cylinder and piston, normally operated by the suction of an internal combustion engine, a spring, an element operated by said cylinder against said spring, pedal means for operating said element and means for creating vacuum by the operation of said pedal means, said means comprising the piston and check valves within said vacuum cylinder.

DOUGLAS F. LINSLEY.